Jan. 14, 1969 C. CHILOWSKY 3,421,748
CUTTING APPARATUS
Filed July 22, 1965 Sheet 3 of 3

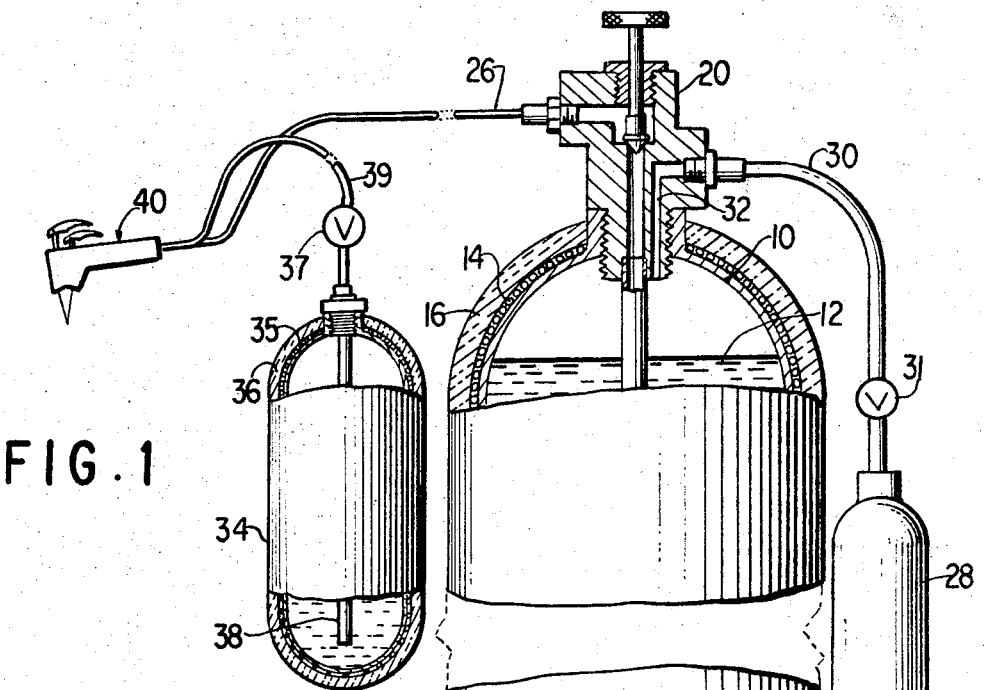
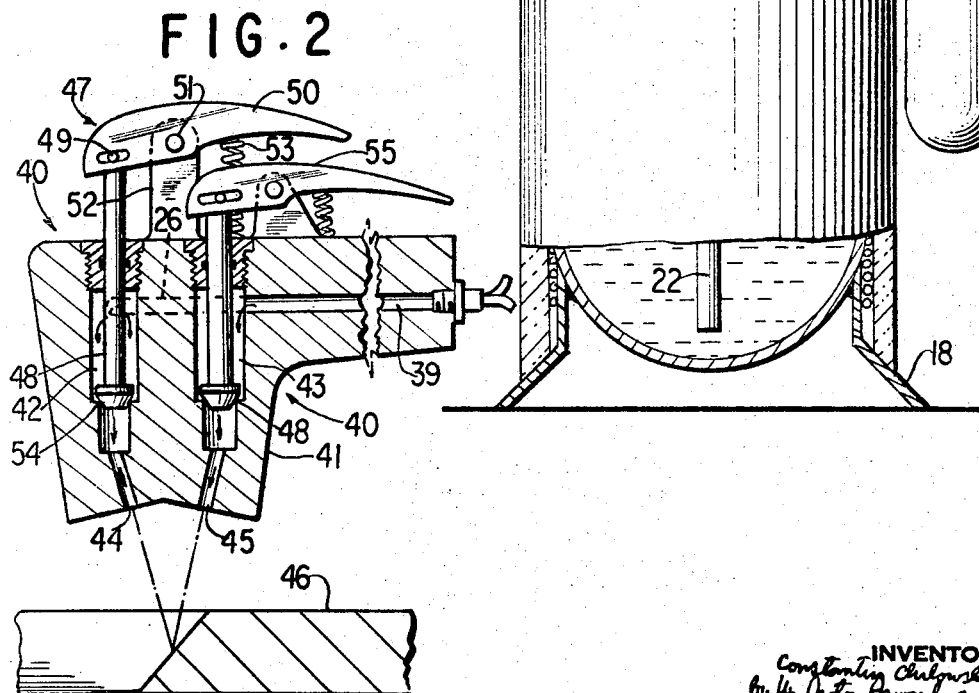

INVENTOR
Constantin Chilowsky, deceased,
by W. Saxon Seward, Executor
BY
Brown & Seward
ATTORNEYS United States Patent Office 3,421,748
Patented Jan. 14, 1969

3,421,748
CUTTING APPARATUS
Constantin Chilowsky, deceased, late of New York, N.Y., by W. Saxton Seward, executor, Morris Township, N.J., assignor to Canrad Precision Industries, Inc., New York, N.Y., a corporation of Delaware
Filed July 22, 1965, Ser. No. 474,186
U.S. Cl. 266—23                              1 Claim
Int. Cl. B23k 5/00; B23k 7/00; F23d 13/40

ABSTRACT OF THE DISCLOSURE

Apparatus for cutting metals comprising a discharge outlet adapted to direct a stream of oxygen-liberating material (particularly in the form of liquified niter) toward a point on the metal to be cut together with a second discharge outlet so located as to direct a stream of combustible material against substantially the same point in order to heat the object at that point to a degree such that oxygen is liberated from the first named material and the object to be cut is thus oxidized and cut at the point of impact of said materials.

---

This invention relates to heat cutting of metals and the like and more particularly to a method and apparatus for cutting metals wherein an oxygen-liberating composition is utilized to supply oxygen directly to the metal at the area being cut.

Heretofore, metals such as iron and steel have been cut by the use of oxygen jets directed against the metal which has been heated to incandescence, the oxygen being supplied in compressed form from cylinders equipped with pressure control valves. This method has the disadvantage that the oxygen is directed to the incandescent surface as a hot and expanded gas having relatively little density so that a good part of the oxygen escapes to the atmosphere without contributing to the combustion. Moreover, the relatively low density of oxygen immediately adjacent the incandescent metal limits the speed of the combustion process and its temperature and therefore, decreases further the effectiveness of the cutting operation due to the increased heat loss through conductivity to the surrounding metal. Due to these limitations and because of the relatively low density of the oxygen jet, the cross sectional area of the oxygen outlet at the burner must be relatively large. Consequently, the width of the cut cannot be made very narrow or as narrow as may be desired and the burning of these relatively large quantities of metal requires corresponding larger quantities of oxygen.

It is an object of this invention to avoid the aforesaid difficulties in prior art practices by the use of an oxygen-liberating composition which releases oxygen in the area of the incandescent metal at greater concentrations and densities. In one embodiment of the invention, a stream of oxygen-liberating composition in liquid form, e.g. of melted niter, is directed against the metal to be cut which has previously been heated to incandescence. Oxygen is released from the niter upon contact with the incandescent metal, thereby furnishing a concentrated supply of oxygen adjacent the metal to burn the latter while at the same time maintaining its incandescence. The metal is initially heated to incandescence by any suitable means, for example, in one illustrated embodiment, by directing a jet of liquid sodium, along with the jet of liquid niter, to the metal surface being cut, preferably so that the two jets meet on the metal at the area or point to be heated or cut. With this arrangement combustion will take place essentially on the surface if the metal where the two liquids impinge. As a result, only a relatively small localized area will be heated and the inefficiency resulting from heating large areas of adjacent metal is reduced.

The liquid niter for the jet may be supplied by melting a supply thereof in solid form. In one embodiment, this is accomplished by containing the niter in a cylinder and heating the latter electrically to its melting temperature. Similarly, the sodium may also be heated and melted in a container by an electrical heating device. The liquid niter and sodium may be delivered from their containers to discharge jets of a burner through separate conduits which may also be heated electrically.

In order to increase the delivery force of the jet of liquid niter, the cylinder containing the latter may be pressurized. In one embodiment this is accomplished by connecting the cylinder to a source of fluid under pressure, e.g. carbonic acid, which will not react with the niter.

Accordingly, it is an object of this invention to provide a method and apparatus for metal cutting wherein increased concentrations and densities of oxygen are supplied at the area being cut to thereby increase the cutting efficiency.

Another object is to increase cutting efficiency by reducing the width of the cut and consequently the amount of metal required to be burned to make a cut.

A further object is to provide certain improvements in the form, construction, arrangement and material of the several elements wherein the above named and other objects may effectively be attained.

Practical embodiments of the invention are shown in the accompanying drawings wherein:

FIG. 1 is an elevational view, partially in section, illustrating one embodiment of the invention.

FIG. 2 is a detail view, partially in vertical section, of a burner which is supplied by the materials shown in FIG. 1.

Figure 3:
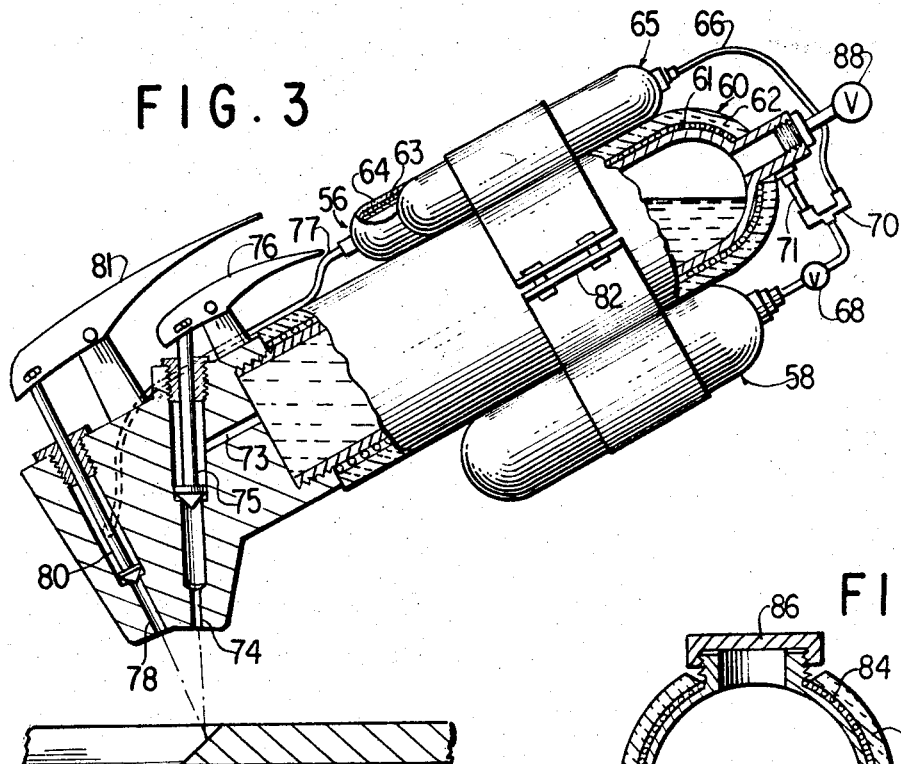
FIG. 3 is an elevational view, partially in vertical section, of an alternative embodiment in which the unit is portable.

Referring to the drawings, FIG. 1 shows a container or cylinder 10 containing an oxygen-liberating material 12, for example, niter, i.e. $NaNO_3$ or $KNO_3$. The niter 12 in cylinder 10 is heated and maintained at or above its melting temperature (approximately 316 degrees centigrade for $NaNO_3$) by suitable means such as an electric heating coil 14 disposed about the outside of the cylinder 10. To reduce heat losses, insulating material 16, e.g. asbestos, is disposed over the heating coil 14. The cylinder 10 may be supported in an upright position by the stand 18.

A valve 20 within an opening at the top of the cylinder 10 controls the flow of liquid niter from the cylinder. This valve has an inlet connected to a tube 22 extending internally of the cylinder 10 and an outlet connected to a conduit 26.

In order to force the liquid niter out through the valve 20 to the conduit 26 with substantial impetus, a source of pressure is applied to the cylinder 10. The source of pressure may be a cylinder of gaseous material which will not react wtih the niter and may comprise a cylinder 28 of carbonic acid communicating with the upper portion of the cylinder 10 via the conduit 30, control valve 31, and passageway 32 in the control valve 20. It will be apparent that the liquid niter heated to its melting temperature by the heating coil 14 will be forced out of the cylinder 10 to the conduit 26 by the pressurized cylinder of carbonic acid 28.

The liquid niter carried by the conduit 26 is adapted to be released from a discharge outlet or jet and directed against a metal surface to be cut, which has previously been heated to incandescence, so that when the liquid niter contacts the incandescent surface, it will decompose and release oxygen. The oxygen, released in concentrated form adjacent the incandescent metal being cut, supports burning of the metal while at the same time maintaining incandescent an adjacent area so that a continuous cut may be made as the jet releasing the liquid niter is advanced on to the adjacent incandescent area. The initial heating to incandescence may be accomplished by any suitable means, for example, by a separate heating device such as an acetylene torch or, as illustrated in the drawings, by the use of liquid sodium.

The liquid sodium is contained in a cylinder 34 which is heated and maintained at or above the melting temperature (97.6 degrees centigrade) of the sodium by an electric heating coil 35 disposed about the cylinder 34. As in the case of the niter cylinder, insulation 36 is disposed about the cylinder to reduce heat losses. A valve 37 controlling the flow of liquid sodium from the cylinder 34 has an inlet connected to a tube 38 extending internally of the cylinder 34 and an outlet connected to a conduit or tube 39.

The tube 26 for liquid niter and the tube 39 for liquid sodium are led to a cutting burner 40 which is shown as comprising a shaped body 41 of refractory material. The body 41 receives end portions of the tubes which lead to valve chambers 42 and 43, the latter terminating in discharge jets or nozzles 44 and 45. The nozzles 44 and 45 are disposed to direct the liquid niter and sodium into converging streams which meet approximately at the area or point of the metal 46 being cut. Suitable valves on the burner control the flow of liquid from the nozzles. The valve 47 for the liquid niter comprises a reciprocally mounted closure member 48 pivotally connected at 49 to a control handle 50, the latter being pivotally supported at 51 to an upright 52 extending from the burner body 41 and biased by the spring 53 to hold the closure member 48 against the valve seat 54. Manual depression of the control handle 50 to overcome the bias of the spring 53 will open the control valve as desired. The control valve 55 for the liquid sodium is similar and accordingly, will not be described in detail.

The tubes 26 and 39 carrying the liquid niter and sodium may be made of stainless steel and heated electrically by a heating coil (not shown) externally of the tubes or by passing an electric current directly through the tubes.

It will be understood that the drawings are schematic and that variations in details of construction of the various parts may be employed as desired. For example, in the burner, separate fittings suitably joined as by threaded engagement, may be employed for the nozzles 44 and 45, the valve seat 54, and the sections of tubing within the burner body 41.

In the embodiment of FIG. 3, a portable unit is formed by affixing cylinders of sodium and carbonic acid 56 and 58 respectively, to the main cylinder 60 containing the liquid niter. As in the case of the FIG. 1 embodiment, the niter cylinder 60 is heated by an electric heating coil 61 and insulated by the covering material 62. The sodium cylinder 56 is heated by a heating coil 63 and insulated by the covering 64 or alternatively, the sodium cylinder 56 may be disposed between the heating coil 61 and the niter cylinder 60 so that the coil 61 heats both cylinders.

Figure 5:
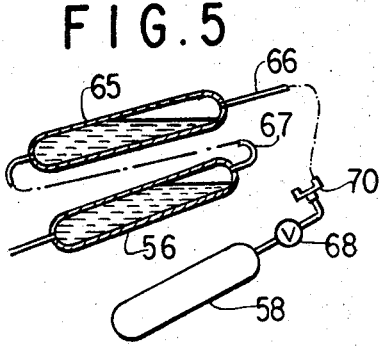
FIG. 5 is a schematic view of the smaller cylinders affixed to the portable unit of FIG. 3.

In order to force the liquid sodium out of its cylinder 56 at elevated pressures, the pressure of the carbonic acid in the cylinder 58 may be applied to the sodium cylinder 56 in addition to the niter cylinder 60. However, in order to preclude any reaction between the carbonic acid and the sodium, means are provided to prevent contact between these two materials. To this end a container 65 (FIG. 5) of buffer material, e.g. oil, which will not react with sodium or niter, is connected at one end via the conduit 66 to the cylinder of carbonic acid 58 and at the other end to the cylinder of sodium 56 via the conduit 67. The outlet from the carbonic acid cylinder 58 includes a control valve 68 and a branch fitting 70 connected to one conduit 66 leading to the buffer cylinder 65 and to another conduit 71 leading to the niter cylinder 60 thereby serving to pressurize the niter cylinder 60 and the sodium cylinder 56, the latter via the buffer cylinder 65.

The niter cylinder 60 has an outlet conduit 73 leading to a discharge nozzle 74 and a control valve 75 with an operating handle 76 to control the discharge of niter. The sodium cylinder 56 has an outlet conduit 77 leading to a discharge nozzle 78 adjacent the niter discharge nozzle 74. A control valve 80 having an operating handle 81 controls the discharge of sodium. The two discharge nozzles 74 and 78 are disposed to direct converging streams of liquid niter and sodium onto the metal to be cut as in the first described embodiment.

Since the three cylinders 56, 58 and 65 are affixed to the larger niter cylinder 60, as by the brackets 82, the assembly forms a compact portable unit which may be handled and operated by an individual operator as desired, with or without an adjustable overhead support of the type commonly used with heavy tools.

Figure 4:
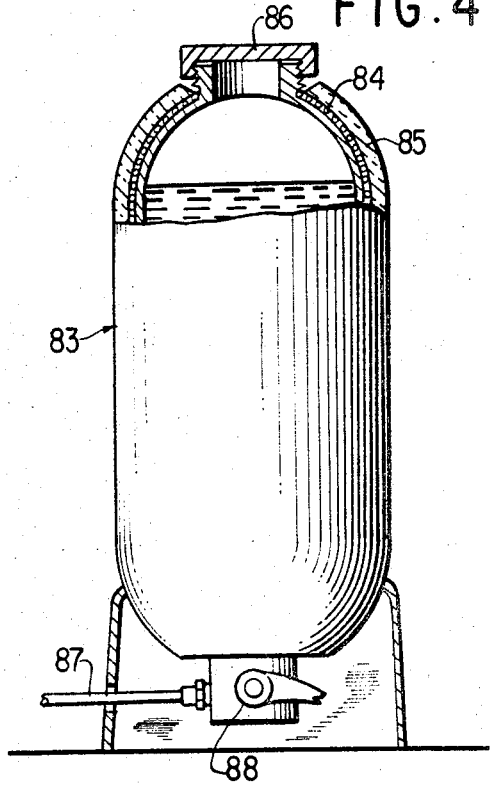
FIG. 4 is an elevational view, parts being broken away and shown in section, of a container used to supply the portable unit of FIG. 3.

As the liquid niter is used up, it may be replenished from a larger cylinder 83 (FIG. 4) which maintains an available supply of melted niter. To this end the supply cylinder 83 is heated by an electric heating coil 84 which is insulated by the covering 85. Niter is admitted to the cylinder by removing the cover 86. An outlet spout 87 having a control valve 88 is adapted to be connected to the inlet valve 88 on the niter cylinder 60 to supply the latter when desired.

From the above description it will be observed that the portable unit may be operated manually by manipulating the valve handles 76, 81 to discharge liquid sodium and niter under pressure through discharge nozzles 78, 74 into converging streams and that the liquid niter may be readily replenished as desired.

Figure 6:
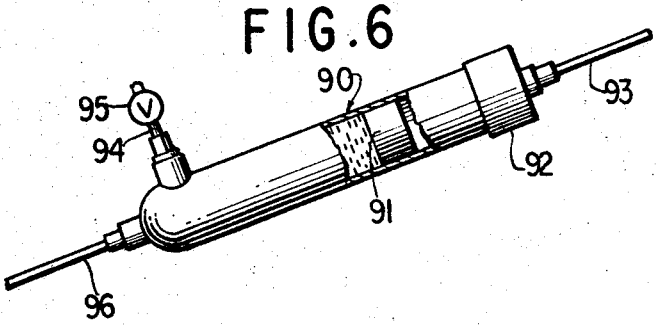
FIG. 6 is a detail view of a cylinder and plunger which may be used in place of the arrangement shown in FIG. 5.

In place of the buffer cylinder 65, a plunger and cylinder arrangement as shown in FIG. 6 may be used to isolate the sodium and carbonic acid. Thus a cylinder 90 having a movable plunger 91 in sealing engagement therewith has a cover 92 with a conduit 93 leading from the carbonic acid cylinder 58 and a second inlet 94, with control valve 95, for liquid sodium on the opposite side of the plunger 91. A third conduit 96 on the cylinder 91 leads to the sodium discharge nozzle 78. It will be readily apparent that the carbonic acid acting on the plunger 91 will pressurize the sodium while the plunger isolates one from the other. The control valve 95 may be opened periodically to replenish the cylinder with liquid sodium as required.

Figure 7:
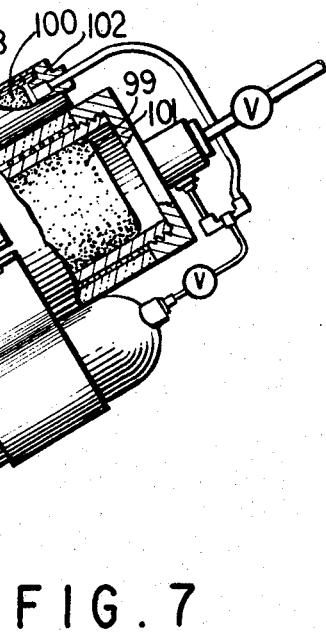
FIG. 7 is an elevation, partially in section, of a further alternate embodiment.

FIG. 7 illustrates a modification of the portable unit of FIG. 3 wherein a niter cylinder 97 and sodium cylinder 98 are periodically charged with bars of solid niter 99 and solid sodium 100 respectively. Suitable access openings and covers are provided at 101 and 102 to admit the solid bars. The niter cylinder and sodium cylinder are heated by electric heating coils and insulated as previously described. In operation, it is convenient to use two units of the type shown in FIG. 7, so that when one is used for cutting, the other may be in the process of melting the niter and sodium by the electric coil in order to be ready for use after the supply in the first unit has been expended.

As alternate arrangements (not shown) for the portable units in FIGS. 3 and 7, the liquid sodium, which does not require a great deal of heat to melt (the melting temperature of sodium is approximately 97.6 degrees centigrade), and the carbonic acid may be supplied from remote sources via flexible tubing to an appropriate connection on the portable unit. With this arrangement, the portable unit will be more compact without the sodium and carbonic acid cylinders fixed to the niter cylinder.

Although not shown in FIG. 1, it will be evident that the sodium cylinder therein may also be pressurized by carbonic acid similarly to that described in connection with FIG. 3.

In operating the above described embodiments, it is possible to reduce the amount of liquid sodium supplied to its discharge nozzle after the cutting has started and the cutting area is heated to incandescence. In some cases, it is possible to stop the discharge of liquid sodium and have the cutting proceed with only the jet of liquid niter since, as previously described, the oxygen liberated by the niter will be sufficient to support burning of the metal. Thus since the sodium is used mainly for the initial heating of the metal to incandescence, its supply cylinder need not be excessively large. It is possible to substitute partially or totally for the liquid sodium, a jet of ordinary fuel, e.g. oil, whereby the released orygen from the niter supports combustion of the fuel on the incandescent metal.

Instead of jets of liquid niter and sodium, either one or both may be passed through atomizing jets (not shown) to direct a spray or mist thereof into the metal being cut.

The niter cylinder may be made of stainless steel and protected on the inside by an enameled coating. The outlet tube in the niter cylinder may also be made of stainless steel and protected on the inside by a thin layer of platinum whereas restricted passages, as in the control valve, may be of platinum-iridium or the like.

In place of the carbonic acid for pressurizing the niter, steam may be formed by introducing under pressure drops of water into the niter cylinder. The liquid niter may also be forced out by other liquids having high boiling temperatures, e.g. paraffin oil, glycerine or glyceryltributyrate (tributyrin). In such cases, a buffer piston, e.g. of compressed asbestos, may be provided between the niter and the liquid exerting the pressure.

As a further alternate arrangement, particularly for small units, the electric heating of the niter may be replaced by burning a fuel with niter. Such burning may be internal or external of the niter cylinder. For example, sodium or potassium may be introduced or injected with or without water into a small container, e.g. an axial tube, in the niter cylinder. A small amount of niter is also introduced into the axial tube and the reaction will produce heat to melt the niter in the main part of the cylinder.

As will be evident from the above description, this invention provides for directing a jet of liquid niter against the metal being cut at a high speed, e.g. in the order of 100 meters per second, which instantly spreads on the metal in extremely thin and constantly renewable layers to thereby furnish a concentrated and dense supply of oxygen at the area of the metal being burned. The concentration and density of the oxygen released thereby is much greater than that supplied by a jet of oxygen from an oxygen cylinder, in rough approximation in the order of several thousand times greater. This oxygen, to a great extent, is in the nascent state and is very active. As a result of the above, the speed of combustion is increased and a higher temperature is maintained. Accordingly, combustion may be concentrated in a narrow area and the jet of liquid niter can be directed to penetrate narrow openings or slits to release the oxygen therein and make a narrow cut.

Due to the increased amount of oxygen release, the volume of the niter required to cut a specific amount of metal will be considerably less than the volume of compressed oxygen required to make the same cut. Also the per-unit cost is less than that for systems using compressed oxygen.

In the above description, niter has been indicated as an example of an oxygen-liberating material because of its relatively low cost. However, other oxygen bearing materials may be used, for example, sodium chlorate ($NaClO_3$), or even salts, explosive in themselves, but which become non-explosive in concentrated and hot solutions, e.g. ammonium nitrate ($NH_4NO_3$).

In a further modification, a jet of concentrated hot aqueous solution, very right in niter, and a jet of liquid sodium may be employed. To this combination there may be added any suitable combustible which will burn with the excess oxygen supplied by the niter solution under action of the sodium. This will assure heating of the metal being cut to incandescence so that thereafter, the proportion of sodium and of the combustible may be reduced as the excess oxygen released by the niter assures the cutting of the metal.

It will be understood that various changes may be made in the form, construction and arrangement of the several parts without departing from the spirit and scope of the invention, and hence is not intended to be limited to the details shown or described herein except as the same are included in the claims or may be required by disclosures of the prior art.

What is claimed is:

1. Cutting apparatus, comprising a source of oxygen-liberating material, a discharge outlet adapted to direct a stream of said material toward a point on an object to be cut, means conducting said material from said source to said discharge outlet, a discharge outlet for directing a stream of combustible material against said object to be cut at substantially the same point impinged by said oxygen-liberating material to heat said area to incandescence, a container for the combustible material, heating means to liquify said material, means for pressurizing the material in said container and control means controlling the flow of said materials through said discharge outlets, whereby said materials impinge on said object and the oxygen-liberating material releases oxygen to support burning thereof, said combustible material being sodium and said pressurizing means comprising a pressurized container of carbonic acid, a conduit leading therefrom to said sodium container, and isolating means in said conduit to prevent contact between said sodium and carbonic acid.

References Cited

UNITED STATES PATENTS

| | | | |
|---|---|---|---|
| 2,421,649 | 6/1947 | Priest et al. | 29—494 |
| 2,470,999 | 5/1949 | Meincke | 266—23 X |
| 2,521,740 | 9/1950 | Osborn | 266—23 X |
| 2,642,656 | 6/1953 | Grosse | 29—494 X |
| 3,039,521 | 6/1962 | Hammon | 239—413 |
| 3,071,852 | 1/1963 | Rogers | 29—494 X |

J. SPENCER OVERHOLSER, *Primary Examiner.*

EUGENE MAR, *Assistant Examiner.*

U.S. Cl. X.R.

239—413